Aug. 19, 1958 S. E. MILLER 2,848,690
HIGH FREQUENCY SELECTIVE MODE TRANSDUCERS
Filed May 27, 1953 5 Sheets-Sheet 1

INVENTOR
S. E. MILLER
BY
H. O. Wright
ATTORNEY

Aug. 19, 1958 S. E. MILLER 2,848,690
HIGH FREQUENCY SELECTIVE MODE TRANSDUCERS
Filed May 27, 1953 5 Sheets-Sheet 2

INVENTOR
S. E. MILLER
BY
*H. O. Wright*
ATTORNEY

United States Patent Office 2,848,690
Patented Aug. 19, 1958

2,848,690

HIGH FREQUENCY SELECTIVE MODE TRANSDUCERS

Stewart E. Miller, Middletown, N. J., assignor to Bell Telephone Laboratories, Incorporated, New York, N. Y., a corporation of New York Application May 27, 1953, Serial No. 357,665

10 Claims. (Cl. 333—10)

This invention relates to novel arrangements for interconnecting circularly cylindrical, single hollow conductor wave-guide transmission lines with single hollow conductor wave guides of rectangular cross-section, one cross-sectional dimension of said latter type wave guide being substantially double the other cross-sectional dimension. More particularly, it relates to arrangements of the character described above, in which the preferred mode of wave in either of the two types of wave guide mentioned will generate in the other wave guide the preferred mode of wave for the other wave guide.

The preferred mode of wave in the circularly cylindrical single hollow conductor wave guide, is, for the purposes contemplated in this application, the so-called "circular electric wave" designated "$TE_{01}$" as illustrated in Fig. 5.4–1(c) on page 120 of the book entitled "Principles and Applications of Waveguide Transmission" by Dr. G. C. Southworth, published by D. Van Nostrand Co., New York, New York, 1950. Likewise, the preferred mode of wave in the single hollow conductor wave guide of rectangular cross-section having one cross-sectional dimension substantially double the other, is, for the purposes contemplated in this application, the so-called "dominant wave" designated "$TE_{10}$" as illustrated at the left in Fig. 5.3–1 on page 115 of Dr. Southworth's above-mentioned book, it being particularly noted that the lines of electric force are parallel to the shorter sides of the rectangular cross-section of the guide. Accordingly, throughout this specification and in the claims of this application, the designations circular electric mode $TE_{01}$ and dominant mode $TE_{10}$ are to be understood in every instance to mean the modes illustrated in said Fig. 5.4–1(c) and the left illustration of Fig. 4.3–1, respectively of Dr. Southworth's book.

The arrangements of the present invention represent additional forms and variations of high frequency "selective mode transducers" of the general type disclosed and described in detail in my copending application Serial No. 245,210, filed September 5, 1951, now U. S. Patent No. 2,748,350 issued May 29, 1956, which copending application, insofar as it is pertinent to arrangements of the general type disclosed in the present application, is hereby incorporated herein and made a part hereof by reference.

As disclosed in my above-mentioned copending application, guided, high frequency, electromagnetic waves may, under suitable circumstances, assume any one or more of an almost infinite number of modes, which have been classified in general as indicated in said application. However, this specification will be concerned principally hereinunder with four particular modes two of which have been defined above in detail. The third is a mode in a wave guide of sectorial cross-section with an acute sector angle which, because it has many of the characteristics of a field pattern similar to the above-defined rectangular dominant mode $TE_{10}$ wave, will be referred to hereinafter as the "sectorial $TE_{10}$" mode. The fourth is a mode in a wave guide of sectorial cross-section with an obtuse sector angle which, because it has many of the characteristics of the above defined circular electric $TE_{01}$ mode, will be referred to hereinafter as the "sectorial $TE_{01}$" mode. Certain other modes into which the above-defined circular electric $TE_{01}$ mode might transform when transmitted through an imperfect wave guide of circular cross-section will also receive attention.

The present invention is of particular interest because the presently known practicable methods of generating high frequency radio wave energy in wave guides are better adapted to generate non-circular modes, such as the above-defined $TE_{10}$ dominant mode, whereas only waves of the above-defined circular electric $TE_{01}$ mode have the desirable characteristic that as the frequency of the transmitted wave energy increases, the attenuation of said energy decreases. In view of the above, in order that we may take advantage of this last-mentioned characteristic in the wave guide transmission of high frequency radio energy over long distances and at the same time retain the advantages accruing from the use of rectangular wave guide at terminal and repeater stations, it is obviously desirable that convenient and practicable means be provided to cause high frequency radio energy of the above-defined $TE_{10}$ dominant mode established in a rectangular wave guide to establish the above-defined circular electric $TE_{01}$ mode waves in a wave guide of circular cross-section and vice versa.

The following illustrative specific embodiments of the present invention will be discussed with reference to transforming the above-defined $TE_{10}$ dominant mode wave energy into the above-defined $TE_{01}$ circular electric mode wave energy. The converse operation, i. e. changing $TE_{01}$ circular electric mode wave energy into $TE_{10}$ dominant mode wave energy, can nevertheless be accomplished with the same structures, i. e. the principle of reciprocity is valid with respect to these structures. This latter operation must obviously be performed at the receiving end of the circularly cylindrical transmission line in order that the $TE_{01}$ circular electric mode wave energy may be be usefully employed at that point. Therefore, the "feed guide" may feed energy from a generator to the "transmission guide" or it may feed energy from the transmission guide to receiving apparatus. The emphasis in the following discussion concerning the operation of the specific illustrative embodiments shown as feeding energy from a generator to the transmission guide should not, therefore, be interpreted to imply any limitation on the scope of the operation or usefulness of the devices and arrangements of the present invention for the inverse operation.

A principal object of the invention is to provide novel, convenient and practicable means for establishing $TE_{01}$ circular electric mode waves in a round wave guide.

It is also an object of the present invention to transfer wave power of a given wave mode in a first transmission line, suitable for one purpose therein, from said first line and to launch it as wave power of another mode suitable for another purpose in a second transmission line.

Another object of the invention is to transfer a predetermined portion of the energy, or the entire energy, of a first mode in a first type of wave guide into energy of a second mode in a second type of wave guide.

It is a further object of the present invention to select wave energy having a specific mode configuration in a multi-mode transmission line and to suppress wave energy having other mode configurations.

Also, it is an object of the present invention to cause electromagnetic wave energy of the dominant mode in a wave guide of rectangular, or sectorially shaped, cross-section, to launch electromagnetic wave energy of circular mode in a wave guide of circular cross-section, and vice versa.

Other objects, aspects, advantages, and features of the invention will become apparent during the course of the following detailed description of specific preferred illustrative embodiments of the invention when read in conjunction with the accompanying drawings in which:

Figure 1:
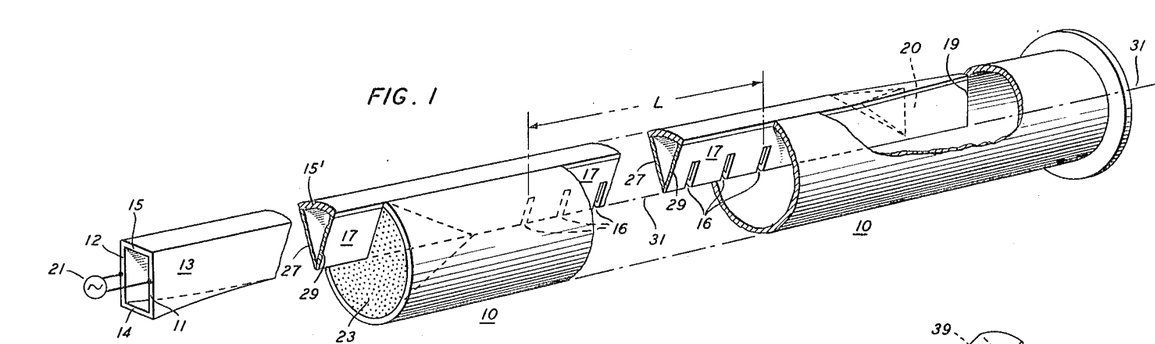
Fig. 1 is a perspective view of one specific embodiment of mode transducer of the invention, with portions cut away to show more clearly particular internal structural features.

In more detail, Fig. 1 shows one specific illustrative embodiment of a high frequency, selective mode transducer in accordance with the invention, for transforming dominant mode $TE_{10}$ wave energy in a rectangular wave guide into circular electric mode $TE_{01}$ wave energy in a circular wave guide and vice versa. The transducer consists of a "feed guide" 13, 17, and a "transmission guide" 10.

The portion of the feed guide 13, 17 to the left of guide 10 tapers from left to right as shown. The left end 13 is of rectangular cross-section and has two larger sides 11 and 12 which are at least one-half wave length of the lowest frequency to be transmitted through the guide, and two smaller sides 14 and 15, which are usually approximately one-half the length of the longer sides. The device 21 is a conventionalized showing of an ultra high frequency wave generator. This generator is connected to the left end of wave guide 13 in such manner as to establish dominant mode $TE_{10}$ wave energy therein, in accordance with any of the several arrangements for this purpose well known to those skilled in the art.

The right end 17 is of sectorial cross-section having two equal linear sides 27, 29 joining at an acute angle and a third arcuate side 15' joining the upper ends of sides 27 and 29, the inner surface of side 15' being the arc of a circle the radius of which is equal to the length of the sides 27 and 29. The length of sides 27 and 29 are in turn equal to the radius of the inner surface of main guide 10. Both the feed and main guides are preferably made of highly conductive material such as sheet copper or sheet brass. The cross-section of the feed guide 13, 17 just adjacent to the left end of the main guide 10 is a sector of the circular cross-section of the main guide 10 and the arcuate side 15' of feed guide 13 will register with and become an integral portion of the main guide 10. the longer sides 27, 29 continuing into main guide 10, as shown, and as will be more fully described hereinbelow.

The portion of the feed wave guide 17 enclosed within circular guide 10, comprises the two rectangular longitudinal vanes 27, 29 extending from their junction substantially along the longitudinal axis 31 of the wave guide 10, to the interior surface of the circular guide 10; and the portion of guide 10 included between the outer edges of vanes 27, 29 as shown. There is formed thereby an extension within guide 10 of the feed wave guide 17 of sectorially shaped cross section. An array of coupling slots 16, distributed over a length L as described hereinafter, are cut into the guide 17 along the edge substantially coincident with center line 31 of wave guide 10, as shown.

The wave guide 17 is terminated electrically in a reflectionless manner near its right end 19 beyond the apertures 16 by a wedge 20 of lossy material having an exposed surface, at its left end, of suitably tapered form, it being in this instance, for example, of concave prismatic shape, as shown. Also, between the apertures 16 and the termination 19, the cross section of the feed wave guide 17, within guide 10, is again tapered to gradually change by reduction of the angle between the vanes 27 and 29. The vanes 27 and 29 finally merge and terminate the feed wave guide 17 in a single radial vane at 19. This tapering termination of the feed wave guide 17 permits the "sectorial $TE_{01}$ mode" wave energy traveling to the right in the transmission wave guide 10 to close itself gradually into the $TE_{01}$ circular electric mode without significant loss of power to other modes.

The wave guide 10 is also terminated in a reflectionless manner by a conically shaped member 23 of lossy material fitted into guide 10 and around guide 17 at the left end of guide 10, as shown, where the guide 17 enters. The right end of the guide 10 is intended, for normal operation, to be connected to a suitable load circuit, such as, for example, a long transmission wave guide of similar radius and of circular cross section. Connection to a circular guide of larger diameter can, of course, be effected through a smoothly tapered wave guide transformer section in accordance with principles well known in the art. The impedance of such a load circuit also, preferably, matches that of guide 10.

Although in this specific embodiment the apertures 16 are rectangular and are spaced at intervals of less than one half wavelength along the axis 31 of the transmission wave guide 10, the apertures may be either rectangular or circular, and may be spaced in the vanes 27, 29 at various distances from the axis 31 of the transmission wave guide 10. If rectangular, as shown, the apertures are preferably aligned so that their long dimensions are radial. In any case, however, each aperture in vane 27 is aligned with a corresponding aperture in vane 29.

The significance of the structural details thus far described and the importance of certain other parameters of this structure, may most readily be understood if they are considered in connection with an explanation of the preferred mode of operation of the transducer of Fig. 1. Thus, dominant mode $TE_{10}$ wave energy introduced from source 21 into section 13 will be converted into sectorial $TE_{10}$ waves in section 13 without substantial difficulty so long as this transition is made over an interval of several wavelengths and so long as the sectorial angle of section 17 is sufficiently small. Under this condition there is some alteration of the proportions of the guides but the slight distortions resulting therefrom of the electric field in converting from the $TE_{10}$ mode to the sectorial $TE_{10}$ mode will not tend to introduce substantial spurious modes. If the sector angle is too large, however, undesirable spurious modes may be generated and supported in section 17.

As is developed by mathematical analysis in my above-mentioned copending application, when two transminsion lines of similar or different characteristics are coupled together over a longitudinal length thereof, wave energy in a particular mode in one line will be transferred into wave energy in another mode in the other line when the velocities of propagation of these particular modes in the two lines are equal. The structure in accordance with the present invention provides this necessary relationship between the sectorial $TE_{10}$ mode in feed guide 17 and the sectorial $TE_{01}$ mode in main guide 10. The phase velocity of the dominant sectorial $TE_{10}$ mode in guide 17 depends solely upon the radial dimension of the sector. Likewise, the phase velocity of the sectorial $TE_{01}$ mode in guide 10 is determined by this same radial dimension. Thus, the guide wavelength for the sectorial $TE_{01}$ mode in guide 10 is equal to the guide wave length for the sectorial $TE_{10}$ mode in guide 17. Other modes which might be supported in guide 10 will have wavelengths different from the sectorial $TE_{01}$ mode and therefore, from the sectorial $TE_{10}$ mode.

Thus, as the sectorial $TE_{10}$ energy travels along guide 17, portions of it will be successively transferred into guide 10 by coupling apertures 16. So far as transmission of this energy in guide 10 in the backward direction toward absorber 23 is concerned, the structure is inherently a directional coupler, i. e., a minimum transmission of energy in a backward direction in guide 10 will be found since the collective effect of a large number of discrete coupling elements spaced at less than one-half wave length apart is of itself directionally selective as is well known in the directional coupler art. For this reason, any of the many distributions for a plurality of discrete points known to the art may, in addition, be used to improve the directivity or to increase the band width over which a given directivity is maintained. A number of these distributions are collected and analyzed in an article, "Directive Coupling in Wave Guides," by M. Surdin in the Journal of the Institution of Electrical Engineers, vol. 93, 1946, part IIIA, pages 725–726, any of which are suitable for the purposes of the present invention.

The present invention is concerned primarily with the transmission of sectorial $TE_{01}$ energy in the forward direction in guide 10. Thus, energy transferred through the first of apertures 16 which happens to appear in guide 10 in the sectorial $TE_{01}$ mode will experience in this transfer a 90 degree phase delay. This energy travels to the right in guide 10 to the second of apertures 16, whereby part of it is returned to guide 17 with a further delay of 90 degrees. Thus, the energy which goes from line 17 to line 10 and back to line 17 by way of a later aperture arrives in line 17 out of phase with the sectorial $TE_{10}$ energy which travels straight through line 17. On the other hand, all components of the sectorial $TE_{01}$ energy in line 10 are in phase. A summation of such components eventually results in cancellation of the sectorial $TE_{10}$ energy in line 17 and the transfer thereof into sectorial $TE_{01}$ energy in line 10.

But since the necessary dimensions of guide 10 render this guide multimode and capable of supporting several other modes in addition to the desired sectorial $TE_{01}$ mode, it would be expected that a substantial portion of the original $TE_{10}$ energy would appear in unwanted spurious modes in guide 10. It is a fact that several sectorial modes, each corresponding to the $TE_{31}$ and $TE_{21}$ and $TE_{11}$ modes in a full circular guide may be supported in sectorial guide 10. TM modes can exist in sectorial guide 10, but the degeneracy between $TM_{11}$ and $TE_{01}$, which exists in hollow round guides is removed by the insertion of guide 17.

The most critical mode to be discriminated against in this group is the mode which has a guide wave length or phase velocity nearest to the guide wave length or phase velocity of the desired sectorial $TE_{01}$ mode. Of the spurious modes noted above, the guide wave length in sectorial guide 10 of the sectorial $TE_{31}$ mode is the nearest to the guide wave length of the sectorial $TE_{01}$ mode. There is no corresponding cancellation and transfer of the type described above for the $TE_{31}$ mode because the guide wave lengths of this mode in line 10 and the sectorial $TE_{10}$ mode in line 17 are different and the necessary in-phase and out-of-phase relationships do not exist. It is, therefore, possible to substantially suppress the sectorial $TE_{31}$ mode in the forward direction of transmission by making the length L of the coupling array at least equal to $$\frac{\theta}{\pi\left(\frac{1}{\lambda_{TE_{01}}} - \frac{1}{\lambda_{TE_{31}}}\right)}$$

wherein $\lambda_{TE_{01}}$ is the guide wave length of the sectorial $TE_{01}$ mode in guide 10, wherein $\lambda_{TE_{31}}$ is the guide wave length of the sectorial spurious mode in guide 10, and wherein $\theta$ is at least the value of the periodic angle of the Fourier transform for the particular coupling distribution employed at which the characteristic of the transform first passes through zero. The derivation of this relationship is rather complicated and will not be set out in detail here, but if further information is desired, reference may be had to my above-mentioned copending application in which the full derivation is set out. As is well known, a Fourier transform of the coupling distribution is a precalculated evaluation of the integral of this particular coupling distribution. Fourier transforms have been derived by the mathematical art for countless distributions. In its present use the transform is proportional to the forward current of wave energy in a given mode in guide 10. When the value of the periodic angle $\theta$ is such that the value of the transform is zero, the forward current in the spurious mode will be zero. A particular example of the application of the Fourier transform is also set out in detail in my above-mentioned copending application.

The number and amplitude strength of coupling apertures 16 is of principal importance in determining the fraction of sectorial $TE_{10}$ mode wave energy transferred from guide 17 into sectorial $TE_{01}$ mode wave energy in line 10. The exact ratio of the power transferred into the $TE_{01}$ mode wave energy is determined by the integrated coupling strength factor dependent upon the strength and distribution of the coupling between guides 17 and 10. As described in detail in my above-mentioned copending application this factor is expressed as $$n \sin^{-1} C$$

in which $n$ represents the number of coupling apertures and $C$ represents the coupling factor of each of these points. All of the power in line 17 will be transferred into $TE_{01}$ mode power in line 10 when this quantity is equal to $$\frac{m\pi}{2}$$

where $m$ is any odd integer. Lesser ratios are transferred for smaller fractions of $\pi$.

Since the field pattern of the sectorial $TE_{01}$ mode in line 10 is substantially similar to the field pattern of the circular electric $TE_{01}$ mode in a guide of complete circular cross-section of the same radius, power will be converted from the sectorial mode without substantial difficulty so long as the transition is made over an interval of several wave lengths. This consideration is very similar to the consideration examined above in connection with the transition from rectangular guide 13 to sectorial guide 17. In general, the sector angle of section 17 should be made small for this reason and in a particular embodiment should probably not exceed 30 degrees. Angles smaller than this value may be desirable except in so far as attenuation will be introduced in section 17 when the angle becomes exceptionally small. It is a desirable coincidence that the proportioning of the feed guide as described hereinabove facilitates a neat mechanical combination of the feed and main guides. Feed guides of substantially different cross-sections can, of course, be designed which will generate the desired $TE_{01}$ mode wave in the main guide 10, but such designs may involve undesirable phase velocity differences and/or undesirable degeneration of the "sectorial $TE_{10}$" wave in the feed guide. While such undesirable results may in many instances be compensated for in whole or in part by means well known to those skilled in the art, a substantial sacrifice in the functional simplicity of the mechanical and electrical design required will normally be incurred.

Figure 2:
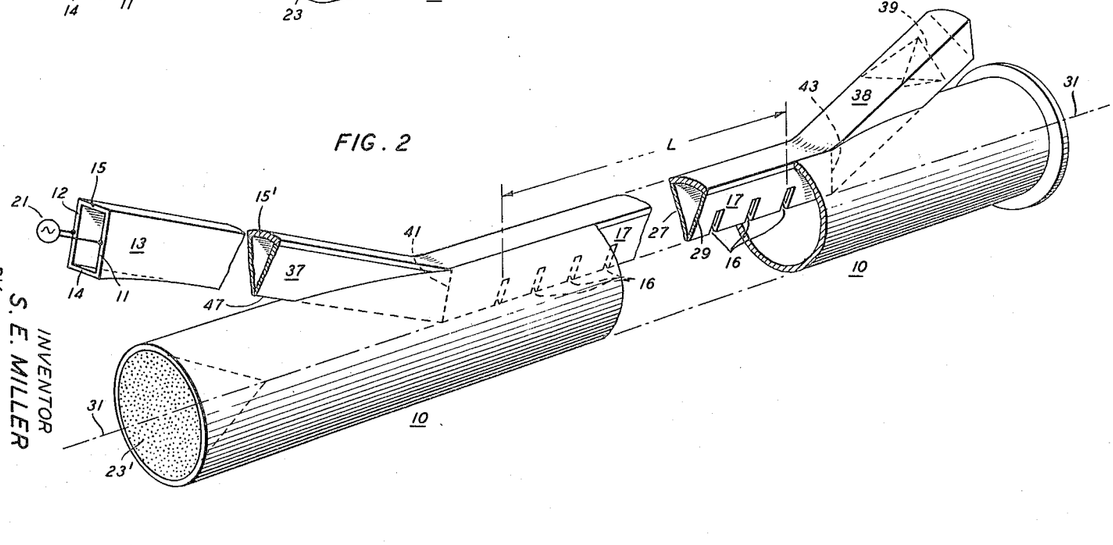
Fig. 2 is a perspective view with portions cut away to show more clearly particular internal structural features of a second specific embodiment of mode transducer of the invention, differing from that of Fig. 1 in introducing the feed guide into the circular wave guide at an angle.

In Fig. 2, a second specific illustrative embodiment of a high frequency, selective mode transducer, in accordance with the invention, is shown. It differs from the embodiment of Fig. 1 principally in that the ends 37, 38 of the feed wave guide 13, 37, 17, 38 enter the wall of wave guide 10, at angles to the axis 31 of wave guide 10, as shown, and join at planes 41 and 43, respectively, to the central section 17 of the feed wave guide. The section of wave guide 38 is terminated at its right end by a suitably tapered dissipative member 39 which substantially matches the impedance of the feed wave guide and absorbs power incident upon it, thus effectively preventing the establishing of standing wave energy in the feed wave guide 13, 37, 17, 38.

The section 17 of the feed wave guide is parallel to the axis 31 of the guide 10 as shown. In this instance, section 38 need not be tapered longitudinally, as was required for the right end of section 17 of Fig. 1, since the angular relation of section 38 with respect to guide 10 permits the sectorial $TE_{01}$ mode wave traveling to the right to guide 10 to close itself gradually into the $TE_{01}$ circular electric mode without turbulence. Also, the terminating member 23' at the left end of guide 10 can be, obviously, a complete cone, as shown.

Other than for the distinctions specifically indicated above, the illustrative embodiments shown in Fig. 1 and Fig. 2 are, for all practical purposes, substantially the same. As in Fig. 1, for the structure of Fig. 2 one narrow side 14 of the section of feed wave guide 13, 37 of rectangular cross section at end 13 tapers down to an edge 47, and the other narrow side 15, 15' becomes rounded outwardly toward the right end of section 37. The resulting wave guide portion of sectorially shaped cross section leads into the guide 10 through the cylindrical wall thereof, as shown, and joins angularly at junction plane 41 with the section of wave guide 17.

The features and components designated 10, 11, 12, 13, 14, 15, 15', 16, 17, 21, 27, 29, 31 and L in Fig. 2 are as described for the features and components correspondingly designated in Fig. 1. Beyond the slots 16, the guide section 17 is joined angularly at junction plane 43 by the section of wave guide 38 which has substantially the same form as the section of wave guide 37 and which passes through the wall of the guide 10, as shown. The section of wave guide 38 is terminated electrically with a wedge of lossy material 39, the impedance of which wedge substantially matches the impedance of the wave guide.

As shown, the structure in Fig. 2 operates in a manner almost identical to the operation of the structure of Fig. 1. However, the structure of Fig. 2 may be operated to transmit high frequency radio wave energy in both directions simultaneously, or to receive high frequency radio energy from both directions simultaneously, provided, of course, that terminations 39 and 23' are removed and a converting section like section 13 is added to the right end of section 38 to afford a rectangular wave guide terminal section. It may, when so modified, also be used to receive from one direction and to transmit in the other direction at the same time, as, for example, in a repeater, or in a relay station.

Figure 3:
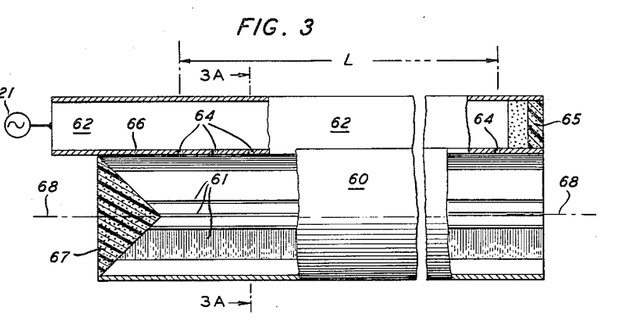
Fig. 3 is a side view, with portions cut away to show more clearly particular internal structural features, of a first modification of a mode transducer of my above-mentioned copending application, which includes longitudinal vanes within the circular wave guide.
Figures 4, 4A:
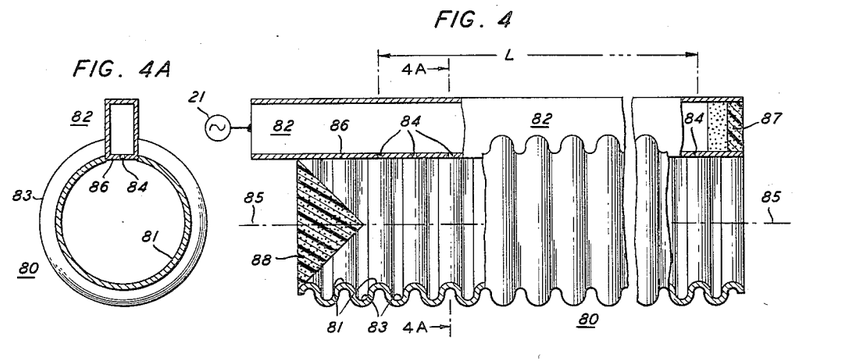
Fig. 4 is a side view, with portions cut away to show more clearly particular internal structural features, of a second modification of a mode transducer of my above-mentioned copending application in which the circular wave guide is corrugated.
Fig. 4A is a cross-sectional view, taken at 4A—4A, of the transducer of Fig. 4.
Figures 5, 5A:
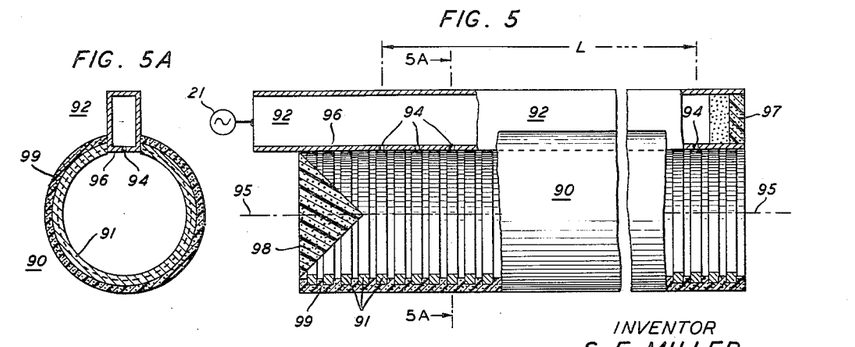
Fig. 5 is a side view with portions cut away to show more clearly particular internal structural features of a third modification of a mode transducer of my above-mentioned copending application, in which the circular wave guide consists of a plurality of like, regularly spaced, conductive rings held in position by a hollow cylinder of substantially non-conductive material, the interval between successive rings being less than a half wave length, the centers of curvature of the rings lying along the longitudinal axis of the circular wave guide.
Fig. 5A is a cross-sectional view, taken at 5A—5A, of the transducer of Fig. 5.

The three species illustrated in Figs. 3, 4 and 5 of the drawings accompanying the present application are of the same general type as that shown in Fig. 1 of my above-mentioned copending application and differ therefrom substantially only in features of the circular wave guide designed to suppress the generation of unwanted spurious mode waves in the circular guide.

Figure 3A:
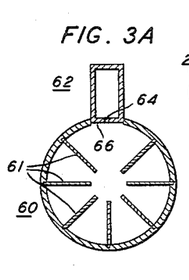
Fig. 3A is a cross-sectional view, taken at 3A—3A, of the transducer of Fig. 3.

More specifically in Fig. 3, a radio wave of the $TE_{10}$ mode is established in the feed wave guide 62 of rectangular cross section by the generator 21. Transmission wave guide 62, of conventional rectangular cross section having its longer sides substantially twice its shorter sides, as shown in the cross-sectional view of Fig. 3A, is coupled to wave guide 60 through a coupling array, comprising in this instance a wall 66 common to the feed guide 62 and to the transmission wave guide 60 of circular cross section, and a plurality of apertures 64 cut into the common wall 66. Wall 66 is one of the narrower sides of feed guide 62 and the general coupling arrangement is, as mentioned above, of the type illustrated in my above-mentioned copending application Serial No. 245,210, by Fig. 1 thereof. The number and spacing of the apertures, as well as the length L over which they are distributed, are determined in substantially the same manner as discussed above with regard to Fig. 1 of the present application.

Upon entering the transmission wave guide 60 the radio energy tends to establish a number of modes therein, but of these, only the $TE_{01}$ mode is reinforced. Other modes, notably the $TM_{11}$ mode, are not only not reinforced, but are in addition suppressed by the discriminatory dissipation characteristics of the plurality of longitudinal, thin vanes 61 of resistive material. Alternatively vanes 61 may be highly conductive material and eddy currents induced by the unwanted mode waves will effect the suppression of such modes. The vanes 61 extend radially, as shown more clearly in the cross-sectional view of Fig. 3A, from the inner surface of the guide 60 toward the longitudinal axis 68 of the guide 60 and are parallel to the axis 68 of guide 60. The radial width of each vane is preferably made ¼ to ¾ of the guide radius. As explained in the copending application, Serial No. 222,006 filed April 20, 1951, by A. P. King, now United States Patent 2,760,171, issued August 21, 1956, assignor to applicant's assignee, at page 3, lines 17 through 24, such vanes arranged in the manner shown do not affect the $TE_{01}$ circular electric mode waves since they are at all points perpendicular to the lines of electric force of the wave, but other mode waves, particularly $TM_{11}$ and similar modes, are effectively suppressed by the vanes. The ends of the vanes may be tapered as shown in the King application to minimize the reflection of energy from their ends.

For normal operation, the feed wave guide 62 is terminated electrically at its right end with a wedge of lossy material 65, having an exposed surface at the left end of the wedge, of concave prismatic shape as shown. The transmission wave guide 60 is likewise terminated at its left end as shown by a cone-shaped mass of lossy material 67. These "lossy" or resistive terminations should in each instance and for all arrangements of the invention have an effective impedance closely matching the characteristic impedance of the particular wave guide in which the particular termination is employed so that standing waves will not result from reflection of energy at the termination. At its right end the circular transmission wave guide 60 is connected to a suitable load circuit, preferably of matching impedance, as described above for the arrangements of Figs. 1 and 2.

Fig. 3A is a cross-sectional view, taken at 3A—3A, of the structure shown in Fig 3. The features and components designated 60, 61, 62, 64, and 66 in Fig. 3A are those features and components correspondingly designated in Fig. 3. The spacing and positioning of the vanes 61 within wave guide 60 is apparent in Fig. 3A.

The structure shown in Fig. 4 in a side view, and in Fig. 4A in a cross-sectional view, taken at 4A—4A, is essentially similar to the structure shown in Fig. 3, except that there are no longitudinal vanes shown in Fig. 4 and Fig 4A and the transmission wave guide 80 is corrugated.

As mentioned above, the structure shown in Fig. 4 is a further specific embodiment of the invention illustrated by Figs. 1 and 1A of my copending application, Serial No. 245,210, filed September 5, 1951, now United States Patent 2,748,350, issued May 29, 1956, in which the form of the circular wave guide, or "transmission guide," has been modified in accordance with Fig. 14 of my copending application, Serial No. 255,835, filed November 10, 1951, now United States Patent 2,774,945, issued December 18, 1956.

A generator 21 of high frequency radio wave energy sends radio waves of the $TE_{10}$ mode along the feed wave guide 82. Wave guide 82 is of conventional rectangular cross section, the vertical sides of the guide being substantially twice the horizontal sides, as indicated in the cross-sectional view of Fig. 4A. This energy is coupled into the corrugated transmission wave guide 80 by means of a coupling array, comprising a plurality of apertures 84 spaced over a minimum distance L in the lower narrow side 86 of the guide 82 substantially as described for the coupling array of the structure of Fig. 1 of the present invention. The guide 82 is inserted into a longitudinal cut in the transmission guide 80 and is positioned so that its longitudinal edges are parallel to the axis 85 of the guide 80 and so that the narrow side 86 is flush with the internal corrugation crests 81.

The apertures 84 are spaced to occur only at internal crests 81 of the corrugations in the guide 80. These crests 81 are spaced less than a half wave length apart. The $TE_{01}$ mode radio wave energy is established in the transmission guide 80, and is effectively transmitted through the cylindrical space defined by the internal crests 81 of the corrugations of wave guide 80.

The wave energy which enters the transmission wave guide 80 from the feed wave guide 82 establishes a number of modes, but of these, only the $TE_{01}$ mode is reinforced, as discussed above with regard to Fig. 1. Other modes, notably the $TM_{11}$ modes, are not only not reinforced, but are in addition suppressed by the action of the crests 81 and the troughs 83 of the guide 80. These crests 81 and troughs 83 lie in parallel planes which are perpendicular to the axis 85 of the guide 80.

At its right end the feed wave guide 82 is terminated in a wedge 87 of a lossy material which has an exposed surface (facing to the left) of concave prismatic shape. The transmission wave guide 80 is terminated at its left end with a cone 88 of lossy material. At its right end the guide 80 should be connected to a suitable load circuit, preferably of matching impedance.

The structure shown in side view in Fig. 5 and in cross-sectional view in Fig. 5A is also essentially similar to the structure shown in Fig. 3, except that in Fig. 5 the transmission wave guide 90 of circular cross section (known as a "spaced ring" wave guide) comprises an alignment of like conductive rings 91 held in place by a cylindrical housing 99 of lossy material. The structure shown in Figs. 5 and 5A is a still further specific embodiment of the invention illustrated by Figs. 1 and 1A of my copending application Serial No. 245,210, filed September 5, 1951, now United States Patent 2,748,350, issued May 29, 1956, in which the form of the circular wave guide has been modified in accordance with Figs. 20F and 20G of my copending application, Serial No. 255,835, filed November 10, 1951, now United States Patent 2,774,945, issued December 18, 1956.

The wave guide 92 is of conventional rectangular cross section, having one dimension substantially twice the other dimension as shown in the cross-sectional view of Fig. 5A. The transmission wave guide 90 of circular cross section consists of an alignment of like conductive rings 91, each ring being in a plane parallel to the planes of the other rings, consecutive rings being spaced less than a half wave length apart. The rings are held in a cylindrical housing 99 made of lossy material such as carbon loaded polyethylene. The planes of the rings 91 are substantially perpendicular to the longitudinal axis 95 of the cylindrical housing 99 and the centers of the rings 91 are located along the axis 95.

A longitudinal opening is cut into the transmission wave guide 90 and a portion of the wave guide 92 is positioned in the opening so that the longitudinal edges of the guide 92 are parallel to the axis 95 of the wave guide 90. The lower narrow side 96 of the wave guide 92 is set flush with the inner surfaces of the rings 91.

Cut into the lower narrow side 96 of the guide 92 is a coupling array, comprising a plurality of apertures 94 distributed over a length L substantially as described for the coupling array of the structure of Fig. 1. The holes occur only at locations where there are conductive rings. The generator 21 of high frequency radio wave energy is connected to the left end of the feed wave guide 92 and a wedge-shaped plug 97 of lossy material is placed in the right end of guide 92. A cone of lossy material 98 is used to terminate electrically the transmission wave guide 90 at its left end. The right end of the transmission wave guide 90 should be connected to a suitable load circuit, preferably of matching impedance.

In operation, the generator 21 of high frequency radio wave energy sends energy of the $TE_{10}$ mode along the feed wave guide 92. A number of modes are set up in the transmission wave guide 90, by energy entering guide 90 through the array of coupling apertures 94, but of these modes, only the $TE_{01}$ mode is reinforced, as discussed above with regard to the structure of Fig. 1. Other modes, notably the $TM_{11}$ mode, are not only not reinforced, but are in addition suppressed by the action of the "spaced-ring" wave guide 90.

In Fig. 5A, a cross-sectional view, taken at 5A—5A, of the structure of Fig. 5 is shown and the features and components designated 90, 91, 92, 94, 96 and 99 are those features and components correspondingly designated in Fig. 5.

Figure 6:
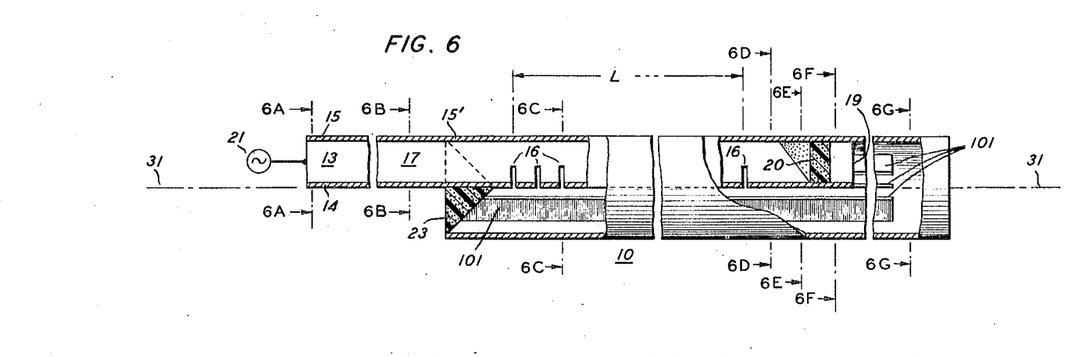
Fig. 6 shows a side view, with portions cut away to show more clearly particular internal structural features, of a modification of the transducer of Fig. 1, which includes longitudinal vanes assembled within the circular wave guide.

A further structure of the invention is shown in the side view of Fig. 6 and in the cross-sectional views of Figs. 6A, 6B, 6C, 6D, 6E, 6F and 6G, taken, respectively at 6A—6A, 6B—6B, 6C—6C, 6D—6D, 6E—6E, 6F—6F, and 6G—6G. This structure is exactly like the structure of Fig. 1, except for the addition of a plurality of radially positioned thin longitudinal vanes 101 of resistive material. Alternatively, vanes 101 may be of conductive material as for the vanes 61 of Fig. 3. This structure is obviously the structure of Fig. 1 with longitudinal vanes 101 added in substantially the same manner as for the vanes 61 of Fig. 3.

The features and components in Figs. 6, 6A, 6B, 6C, 6D, 6E, 6F and 6G designated 10, 11, 12, 13, 14, 15, 15', 16, 17, 19, 20, 21, 23, 27, 29, 31 and L are as described for the features and components correspondingly designated in Fig. 1. The operation of the structure of Fig. 6 is substantially the same as described above in connection with the structure of Fig. 1. The addition of vanes 101 is, of course, to suppress unwanted, spurious mode waves which may be set up when high frequency radio wave energy passes from the feed guide 17 to the transmission guide 10, in substantially the same way as for the vanes 61 of Fig. 3A. The vanes 101 are especially useful in suppressing the $TM_{11}$ mode. Several wave lengths beyond the termination 19 of the guide 17, the vanes 101 are terminated and the guide 10 extends without vanes.

Figures 6A, 6B, 6C, 6E, 6F:
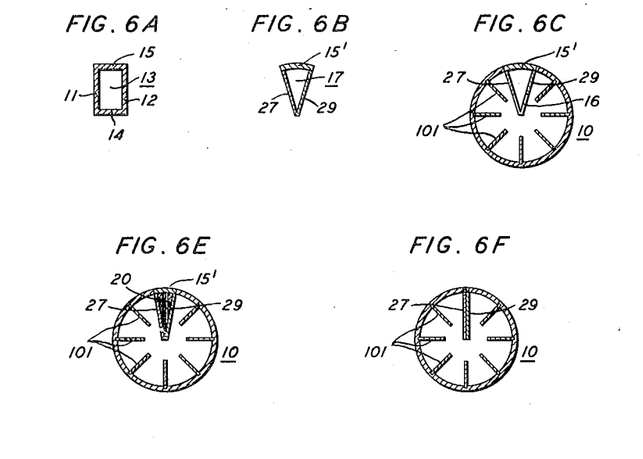
Figs. 6A, 6B, 6C, 6D, 6E, 6F and 6G are cross-sectional views of the transducer of Fig. 6, taken, respectively, at 6A—6A, 6B—6B, 6C—6C, 6D—6D, 6E—6E, 6F—6F, and 6G—6G.
Figures 6D, 6G:
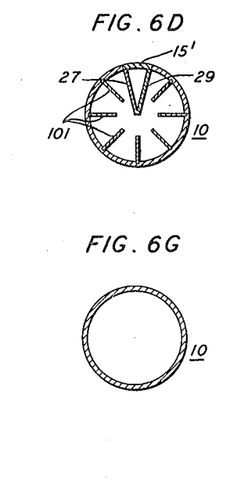

The cross-sectional views of Figs. 6A, 6B, and 6C show more clearly the transitions of the structure from a rectangular wave guide to a sectorially-shaped wave guide and thence to a sectorially-shaped wave guide within a circular wave guide provided with radially positioned, longitudinal, resistive vanes. Figs. 6C, 6D, 6E and 6F illustrate the tapering of the sectorially-shaped wave guide toward the right beyond the coupling region. The wave guide 17 as it gradually decreases its apex angle ultimately becomes a single radially positioned conductive vane within the circular wave guide at its end 19, as shown. Fig. 6G illustrates the circular wave guide 10 without the radially positioned, longitudinal vanes 101. While resistive vanes are somewhat more effective, conductive vanes of, for example, thin sheet copper, would, as mentioned above, also serve to substantially suppress spurious modes such as the $TM_{11}$ mode and the like.

Figure 7:
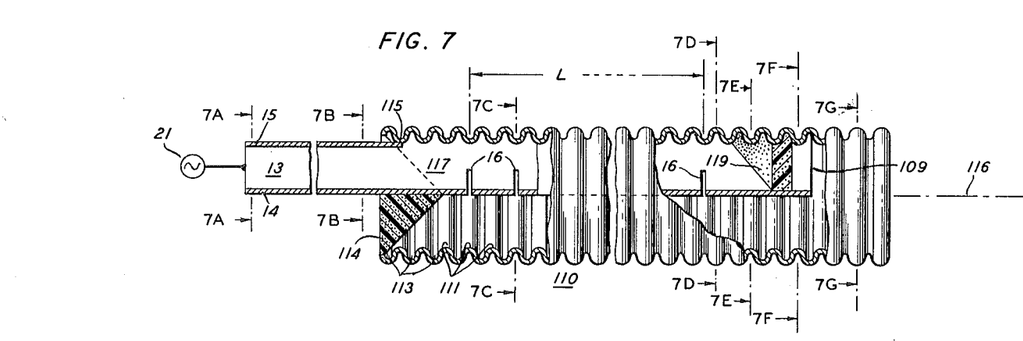
Fig. 7 shows a side view, with portions cut away to show more clearly particular internal structural features, of a modification of the transducer of Fig. 1, which includes a corrugated circular wave guide of the type shown in Fig. 4.
Figure 7A:
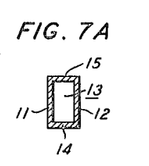
Figs. 7A, 7B, 7C, 7D, 7E, 7F and 7G are cross-sectional views of the transducer of Fig. 7 taken, respectively, at 7A—7A, 7B—7B, 7C—7C, 7D—7D, 7E—7E, 7F—7F, and 7G—7G.
Figure 7B:
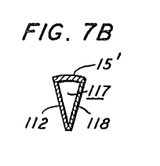
Figure 7C:
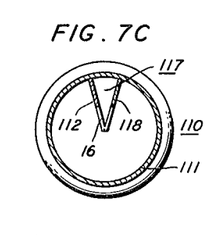
Figure 7D:
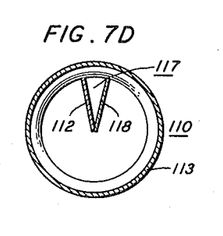
Figure 7E:
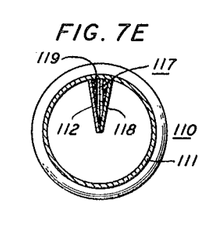
Figure 7F:
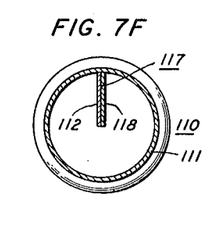
Figure 7G:
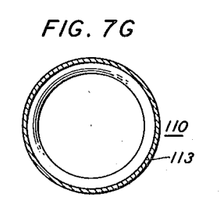

The embodiment shown in side view in Fig. 7 and in the cross-sectional views of Figs. 7A, 7B, 7C, 7D, 7E, 7F and 7G taken, respectively, at 7A—7A, 7B—7B, 7C—7C, 7D—7D, 7E—7E, 7F—7F, and 7G—7G, in Fig. 7, is essentially similar to the embodiment shown in Fig. 1 except that the form of the transmission or circular wave guide has been modified as for the structure of Fig. 4 described above and in connection with Fig. 14 of my copending application Serial No. 255,835, filed November 10, 1951, now United States Patent No. 2,774,945, issued December 18, 1956, to a corrugated form. The features and components designated 11, 12, 13, 14, 15, 16, 21 and L in Figs. 7, 7A, 7B, 7C, 7D, 7E, 7F and 7G are as described for the features and components correspondingly designated in Fig. 1, respectively.

The corrugated transmission guide 110 and the feed wave guide 13, 117, formed in part inside the corrugated transmission wave guide 110, are the essentials of the structure of Figs. 7, 7A, 7B, 7C, 7D, 7E, 7F and 7G. The feed wave guide 13, is, at its left end, of rectangular cross section; and one cross-sectional dimension is substantially twice the other. From the left to the right, the lower narrow side 14 tapers gradually to an edge, while the upper narrow side 15 rounds outwardly to the same curvature as the inner crests 111 of the transmission guide 110. Thus, the portion of feed guide 13 tapers to a cross section of sectorial shape at the junction plane 115 where it forms a smooth junction with the portion of feed guide 117 also of sectorially-shaped cross-section.

The portion of feed wave guide 117, formed within the transmission wave guide 110, comprises the electrically conductive, longitudinal vanes 112 and 118 and the portion of guide 110 included between their outer edges, as shown in Figs. 7, 7C, 7D, 7E and 7F. These vanes extend radially from their junction along the axis 116 of the transmission guide 110 to form a tight junction with the undulating inner surface of the guide 110. A series of coupling slots 16 are cut into the feed wave guide 117 substantially as for the feed guide 17 of Fig. 1. To the right of the coupling array the angular displacement between the vanes 112 and 118 gradually decreases until the vanes merge to become a single vane and then terminate at 109. A plug 119 of lossy material, its exposed surface having a suitably tapered form, in this instance a concave prismatic shape, is used to give the wave guide 117 an electrically reflectionless termination.

The transmission wave guide 110 of circular cross section is corrugated, the interior crests 111 and interior troughs 113 running around the circumference of the guide 110. At its left end, guide 110 is terminated in an electrically reflectionless manner by a conically shaped plug 114 of lossy material. At its right end the guide 110 should be connected to a suitable load circuit, preferably of matching impedance.

In the operation of the embodiment shown in Figs. 7, 7A, 7B, 7C, 7D, 7E, 7F and 7G, a generator 21 of high frequency radio energy sends radio energy of the $TE_{10}$ mode down the feed wave guide 13, 117. This energy passes through the array of coupling apertures 16 and sets up a number of wave modes in the transmission guide 110. However, as discussed with regard to Fig. 1, the $TE_{01}$ mode is reinforced and transmitted.

Other wave modes, notably the $TM_{11}$ mode, are not only not reinforced because of the presence of the hollow sectorial guide 117 as described with reference to Fig. 1, but are suppressed because of the discriminatory dissipation action of the crests 111 and troughs 113 of the guide 110, as described for the structure of Fig. 4. The crests 111 are less than a half wave length apart.

Again, as discussed with regard to Fig. 1, the apertures 16 could be placed in a variety of positions in the vanes 112 and 118. Also, the cross-sectional shape or the position of the feed wave guide 13, 117, might be changed in a variety of ways, but these changes destroy the functional geometric simplicity of the specific embodiments discussed above.

The cross-sectional views of Figs. 7A, 7B, 7C, 7D, 7E, 7F and 7G show more clearly the transition of the structure from, respectively, a rectangular wave guide to a sectorially-shaped wave guide; to a sectorially-shaped wave guide within a corrugated circular wave guide; to a sectorially-shaped wave guide gradually closing to a single, radially positioned vane within a corrugated circular wave guide; and lastly, to a corrugated circular wave guide.

Figure 8:
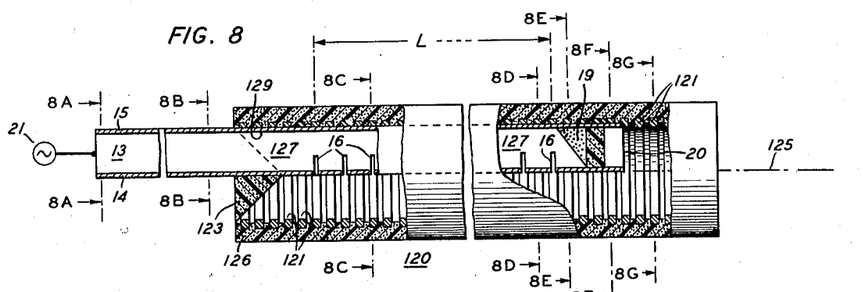
Fig. 8 shows a side view, with portions cut away to show more clearly particular internal structural features, of a modification of the transducer of Fig. 1, which includes a circular wave guide of the type shown in Fig. 5.
Figure 8A:
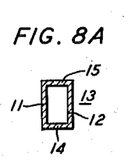
Figs. 8A, 8B, 8C, 8D, 8E, 8F and 8G are cross-sectional views of the transducer of Fig. 8 taken, respectively, at 8A—8A, 8B—8B, 8C—8C, 8D—8D, 8E—8E, 8F—8F, and 8G—8G.
Figure 8B:
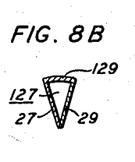
Figure 8C:
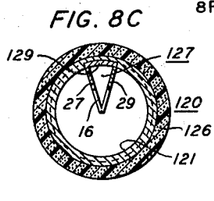
Figure 8D:
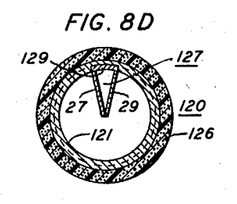
Figure 8E:
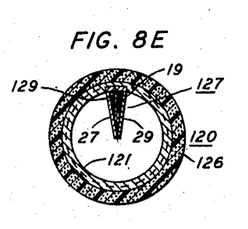
Figure 8F:
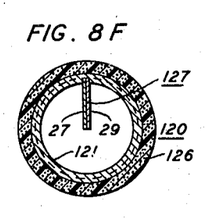
Figure 8G:
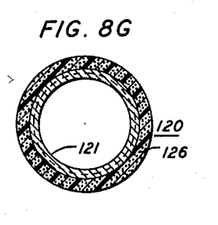

The device shown in side view in Fig. 8 and in cross-sectional views in Figs. 8A, 8B, 8C, 8D, 8E, 8F and 8G taken, respectively, at 8A—8A, 8B—8B, 8C—8C, 8D—8D, 8F—8F, and 8G—8G, in Fig. 8, also is essentially similar in structure and operation to the device shown in Fig. 1 and differs therefrom only in that it utilizes as its circular transmission wave guide a wave guide comprising an alignment of like, electrically conductive, rings 121 mounted in a cylindrical housing 126 made of lossy material. The structure of Fig. 8 is an illustrative specific embodiment of the present invention in which the form of the circular wave guide has been modified as discussed above in connection with Fig. 5 or in connection with Figs. 20F and 20G of my copending application, Serial No. 255,835, filed November 10, 1951, now United States Patent 2,774,945, issued December 18, 1956, also referred to above.

This embodiment has as its principal features the feed wave guide 13, 127, tapering gradually from a rectangular to a sectorially-shaped cross section and the "spaced-ring" type transmission wave guide 120 of circular cross section. The features and components designated 11, 12, 13, 14, 15, 16, 19, 20, 21, 27, 29, and L in Figs. 8, 8A, 8B, 8C, 8D, 8E, 8F and 8G are those features and components correspondingly designated in Fig. 1, respectively.

The portion of feed wave guide 13 is, at its left end, of rectangular cross section with one cross-sectional dimension substantially twice the other. The narrow side 14 tapers gradually to an edge while the narrow side 15 rounds outwardly to form a wave guide of sectorially shaped cross section which forms a smooth junction with a portion of the feed wave guide 127. The sectorially shaped guide 127 is similar to the guide 17 of Fig. 1, but has it own curvate top piece 129 which extends for the length of the portion 127 of feed guide 13, 127. The narrow edge of the guide 127 (junction of sides 27 and 29) is located along the axis 125 of the transmission guide 120, and cut into this edge are an array of coupling apertures 16 distributed over the length L, as described for the apertures 16 of guide 17 of Fig. 1.

Beyond the array of coupling apertures 16 the angular displacement between the sides 27 and 29 gradually decreases until the sides meet in a single, radially positioned vane and terminate at 20. The guide 127 is terminated in an electrically reflectionless manner by a plug 19 of lossy material having an exposed surface of suitably tapered form, in this instance of concave prismatic shape.

The transmission guide 120 is constructed in the manner as described for guide 90 shown in Figs. 5 and 5A. Electrically conductive like rings 121 are aligned so that their planes are parallel to each other and perpendicular to the longitudinal axis 125 of the overall structure. The centers of all of the rings 121 are located on axis 125. The spacing between the rings 121 must be less than a half wave length, although the width of each ring is not critical. The rings 121 are held in place by a cylindrical housing 126 of electrically lossy material such as carbon-loaded polyethylene. The axis of this cylindrical housing is also axis 125.

For the length of the portion 127 of feed guide 13, 127, the rings 121 are notched so that the outwardly rounded side 129 of the feed guide 127 fits into the notched rings and snugly to the inner surface of the housing 126. The feed guide 127 is set deep enough into the inner surface of the housing 126 so that the inner surface of the rounded side 129 of the feed guide 127 is at the same radial distance from the axis 125 as are the inner surfaces of the rings 121.

At its left end the transmission guide 120 is terminated in an electrically reflectionless manner by a cone-shaped plug 123 of lossy material. The right end of the transmission guide 120 should be connected to a suitable load circuit, preferably of matching impedance.

In the operation of the device of Figs. 8, 8A, 8B, 8C, 8D, 8E, 8F and 8G, a generator 21 of high frequency radio energy sends radio wave energy of the $TE_{10}$ mode down the feed wave guide 13, which becomes the sectorial $TE_{10}$ mode in portion 127 and is coupled into guide 120 through the array of coupling apertures 16. A number of different wave modes are then set up in the transmission wave guide 120 but of these only the sectorial $TE_{01}$ mode is reinforced. Other modes, notably the $TM_{11}$ mode, are not only not reinforced because of the presence of sectorial guide 127 as described with reference to Fig. 1, but are in addition effectively suppressed because of the discriminatory dissipation characteristics of the transmission wave guide 120.

The cross-sectional views of Figs. 8A, 8B, 8C, 8D, 8E, 8F and 8G show more clearly the transition of the structure from, respectively, a rectangular wave guide to a sectorially-shaped wave guide to a sectorially-shaped wave guide within a circular wave guide comprising a circular housing lined with rings; then to a sectorially-shaped wave guide gradually closing to a single radially positioned vane within the circular housing lined with rings; and lastly, to a circular wave guide comprising a circular housing lined with rings.

It will be understood, of course, that embodiments of the present invention of the general type illustrated in Fig. 2 may also be devised by substitution of any of various other transmission wave guides such, for example, as those illustrated by Figs. 6, 7 and 8 for the wave guide 10 of Fig. 2. Numerous and varied other structural modifications and arrangements within the spirit and scope of the principles of the present invention will readily occur to those skilled in the art.

What is claimed is:

1. A wave transducer for converting electromagnetic wave energy from one mode into another mode, comprising first and second wave guides having a coextensive portion and forming a through transmission path, said transmission path having first and second ends for conducting said wave energy through said transducer between said ends, the transverse cross-section of said first end of the transmission path being rectangular and varying smoothly along the length of the first wave guide from the first end to an acute angle sector cross-section having an arcuate wall and radial walls, the transverse cross-section of said second transmission end being circular and varying smoothly along the length of the second wave guide from the second end to an obtuse angle sector cross-section having an arcuate wall and radial walls, the two arcuate walls forming a substantially circular cylinder along said coextensive portion of the transmission path, and directional coupling means for transferring energy between said first and second wave guides along said portion.

2. Wave converting apparatus for converting electromagnetic wave energy from one mode into another mode, comprising first and second wave guides forming a through transmission path, said transmission path having first and second ends for conducting said wave energy through said converting apparatus between said ends, the transverse cross-section of said first end being restangular and varying smoothly along the length of the first wave guide from the first end to an acute angle sector cross-section having an arcuate wall and radial walls, the transverse cross-section of said second transmission end being circular and varying smoothly along the length of the second wave guide from the second end to an obtuse angle sector cross-section having an arcuate wall and radial walls, said two arcuate walls having equal radii and a coextensive cylindrical axis along a portion of the transmission path, coupling means located in the radial walls along said coextensive cylindrical axis for transferring wave energy of the desired mode between said first and second wave guides, and wave-energy absorbing means for terminating said first and second wave guides.

3. In a wave transducer for converting electromagnetic wave energy of one mode into another mode, a first and second wave guide, a section of said first wave guide overlapping and in coupling proximity to a section of said second wave guide for forming a longitudinal wave transmission path, the overlapping section of said first wave guide having an acute angle sectorial cross-section, the overlapping section of said second wave guide having an obtuse angle sectorial cross-section, said overlapping sections combining to form a circular cylindrical structure, the sectorial transverse cross-section of the first guide varying smoothly along its length from the overlapping section to a rectangular cross-section, the sectorial transverse cross-section of the second wave guide varying smoothly along its length from the overlapping section to a circular cross-section, and said overlapping sections having common wall portions with a plurality of intercoupling apertures extending therethrough and distributed longitudinally therealong for transmitting wave energy from one guide to another.

4. A wave transducer for converting electromagnetic wave energy from one mode into another mode comprising first and second wave guides forming a through transmission path, said transmission path having first and second ends for conducting said wave energy through said transducer between said ends, the transverse cross-section of said first end being rectangular and varying smoothly along the length of the first wave guide from the first end to an acute angle sector cross-section having an arcuate wall and radial walls, the transverse cross-section of said second transmission end being circular and varying smoothly along the length of the second wave guide from the second end to an obtuse angle sector cross-section having an arcuate wall and radial walls, said arcuate walls of said acute angle sector and said obtuse angle sector forming a circular cylinder along a portion of the transmission path, the portion of said first wave guide which extends within the region of said circular cylinder gradually diminishing with increasing distance from its rectangularly cross-sectioned end, and a plurality of coupling apertures located in said radial walls and distributed longitudinally therealong for transferring energy between the first and second wave guides.

5. In a wave transducer for converting electromagnetic wave energy of a first mode into a second mode, first and second wave guides, said first mode having a guide wave length of $\lambda_1$ in said first wave guide and said second mode having a guide wave length of $\lambda_1$ in said second wave guide, a section of said first wave guide overlapping and in coupling proximity to a section of said second wave guide for forming a longitudinal wave transmission path, the overlapping section of said first wave guide having an acute angle sectorial cross-section, the overlapping section of said second wave guide having an obtuse angle sectorial cross-section, said overlapping sections combining to form a circular cylindrical structure, the sectorial transverse cross-section of the first guide varying smoothly along its length from the overlapping section to a rectangular cross-section, the sectorial transverse cross-section of the second wave guide varying smoothly along its length from the overlapping section to a circular cross-section, said overlapping sections having common wall portions with a plurality of inter-coupling apertures extending therethrough for transmitting wave energy from one guide to the other, said apertures spaced at intervals less than $\frac{1}{2}\lambda_1$, along a length equal to $$\frac{\theta}{\pi\left(\frac{1}{\lambda_1}-\frac{1}{\lambda_2}\right)}$$

wherein $\theta$ is at least the value of the periodic angle of the Fourier transform of said coupling distribution at which the crossing of the transform passes through zero and $\lambda_2$ is the guide wave length of the spurious mode capable of being supported in said wave guide nearest said $\lambda_1$ in said wave guide.

6. A wave transducer for receiving energy in a linearly polarized mode at its input end and for transmitting said energy in the circular-electric mode at its output end, said transducer comprising a conductively bounded wave structure extending from said input end to said output end, said wave structure including first and second wave guides, the transverse cross-section of said input end being rectangular and varying smoothly along the length of the first wave guide from the input end to an acute angle sectorial cross-section having an arcuate wall and radial walls, the transverse cross-section of said output end being circular and varying smoothly along the length of the second wave guide from the output end to an obtuse angle sectorial cross-section having an arcuate wall and radial walls, the two arcuate walls forming a circular cylinder along a portion of the transmission path, the portion of said first wave guide which extends within said circular cylinder diminishing with increasing distance along the first wave guide from the input end, a reflectionless termination located at the end of said first wave guide away from the input end of said transducer and a reflectionless termination located at the end of said second wave guide away from the output end of said transducer, and directional coupling means located in said radial walls for transferring energy between the first and second wave guides.

7. A device of the type defined in claim 1 in which the first wave guide enters the complete circular cylinder at an angle to the axis of said cylinder, extends parallel with said cylinder axis for a length sufficient to include said means for transferring energy, and then extends outside of said cylinder along an axis angularly disposed with said cylindrical axis.

8. A device of the type defined in claim 1 having a plurality of longitudinally disposed rectangular vanes of resistive material extending radially from the inner surface of said second wave guide toward the longitudinal axis thereof, the radial dimension of each said vane being less than the radius of said second wave guide for suppressing undesired modes of electromagnetic wave energy.

9. A device of the type defined in claim 1 in which the periphery of the cylinder structure is corrugated.

10. A device of the type defined in claim 1 in which the said second wave guide comprises an electrically lossy material lined with a plurality of like conductive rings whose centers of curvature are regularly spaced along the longitudinal axis of said second wave guide, said spacing being less than a half wave length.

References Cited in the file of this patent
UNITED STATES PATENTS

| | | |
|---|---|---|
| 2,129,669 | Bowen | Sept. 13, 1938 |
| 2,147,717 | Schelkunoff | Feb. 21, 1939 |
| 2,153,728 | Southworth | Apr. 11, 1939 |
| 2,199,083 | Schelkunoff | Apr. 30, 1940 |
| 2,445,348 | Ford | July 20, 1948 |
| 2,544,923 | Gutton | Mar. 13, 1951 |
| 2,593,155 | Kinzer | Apr. 15, 1952 |
| 2,643,298 | Arnold | June 23, 1953 |
| 2,656,513 | King | Oct. 20, 1953 |
| 2,706,278 | Walker | Apr. 12, 1955 |
| 2,779,006 | Albersheim | Jan. 22, 1957 |
| 2,779,923 | Purcell | Jan. 29, 1957 |